(12) United States Patent
Hegmann et al.

(10) Patent No.: US 7,980,563 B2
(45) Date of Patent: Jul. 19, 2011

(54) FLAT GASKET

(75) Inventors: Oliver Hegmann, Bischofsheim (DE); Thomas Stöckel, Brechen/Werschau (DE); Matthias Baur, Böhringen (DE)

(73) Assignee: ElringKlinger AG, Dettingen (DE)

( * ) Notice: Subject to any disclaimer, the term of this patent is extended or adjusted under 35 U.S.C. 154(b) by 323 days.

(21) Appl. No.: 11/702,257

(22) Filed: Feb. 5, 2007

(65) Prior Publication Data
US 2007/0205565 A1 Sep. 6, 2007

(30) Foreign Application Priority Data
Feb. 9, 2006 (DE) .......................... 10 2006 007 270

(51) Int. Cl.
*F02F 11/00* (2006.01)

(52) U.S. Cl. ...................................... 277/598; 277/593

(58) Field of Classification Search .......... 277/590–594, 277/598
See application file for complete search history.

(56) References Cited

U.S. PATENT DOCUMENTS

| 5,544,901 | A | * | 8/1996 | Kubouchi et al. | 277/591 |
| 5,727,791 | A | * | 3/1998 | Weiss et al. | 277/592 |
| 5,895,056 | A | * | 4/1999 | Habuta et al. | 277/598 |
| 2001/0048201 | A1 | | 12/2001 | Hegmann | 277/591 |
| 2006/0138731 | A1 | * | 6/2006 | Stetter et al. | 277/594 |

FOREIGN PATENT DOCUMENTS
DE        100 37 964 A1    12/2001

* cited by examiner

*Primary Examiner* — Shane Bomar
*Assistant Examiner* — Gilbert Y Lee

(57) ABSTRACT

A flat gasket for sealing a seal gap between engine component sealing faces wherein the flat gasket comprises at least one first and second gasket layer adjacent to the first gasket layer, wherein at least one elastomeric sealing element is disposed at the first gasket layer and is formed from a sealing material which is applied to the first gasket layer and can be cured in situ, wherein at least one cut-out is provided at the second gasket layer, through which cut-out the elastomeric sealing element extends when the flat gasket is in the fitted pressed state, and wherein the flat gasket comprises at least one overflow space which receives excess, as yet uncured sealing material during assembly of the flat gasket and is disposed at least partly laterally next to the sealing element when the flat gasket is in the unfitted, unpressed state.

14 Claims, 8 Drawing Sheets

FLAT GASKET

RELATED APPLICATION

The present disclosure relates to the subject matter which is disclosed in the German patent application No. 10 2006 007 270.7 of 9 Feb. 2006. The entire description of this prior application is made a part of the present description by reference ("incorporation by reference").

FIELD OF DISCLOSURE

The present invention relates to a flat gasket for sealing a seal gap between component sealing faces, which can be pressed against the flat gasket, of engine components,
wherein the flat gasket comprises at least one first gasket layer as well as a second gasket layer which is adjacent to the first gasket layer,
wherein at least one elastomeric sealing element is disposed at the first gasket layer, which element is formed from a sealing material which is applied to the first gasket layer and can be cured in situ, and
wherein at least one cut-out is provided at the second gasket layer, through which cut-out the elastomeric sealing element extends when the flat gasket is in the fitted state.

BACKGROUND

A flat gasket of this kind is known from DE 100 37 964 A1, for example.

The elastomeric sealing element may in particular be disposed where a step is located in one of the component sealing faces which are pressed against the flat gasket when the flat gasket is in the fitted, pressed state.

If the flat gasket is a cylinder head gasket with a chain case sealing region, a step of this kind occurs in at least one of the component sealing faces which is adjacent to the cylinder head gasket, in particular in the region of a joint between the engine block and a chain case lower part which is adjacent to the engine block and/or at a joint between the cylinder head and a chain case upper part which is adjacent to the cylinder head.

In order to obtain at a step of this kind a reliable seal by means of an elastomeric sealing element which crosses the step, on the one hand sufficient sealing material must be made available so that a sealing bead of a sufficient height is formed upon mounting the cylinder head gasket and subsequent curing (e.g. at the operating temperature of the engine or a lower temperature which is raised with respect to room temperature). On the other hand there should also not be too much sealing material, as excess sealing material may run in between the gasket layers of the cylinder head gasket and/or between the cylinder head gasket and the component sealing faces and be cured here when the cylinder head gasket is mounted, whereby the individual gasket layers of the cylinder head gasket or the component sealing faces and the outer main faces of the cylinder head gasket are undesirably held at a spacing from one another.

As the height of the step in the component sealing face is subject to considerable fluctuation on account of the manufacturing and mounting tolerances, it is therefore difficult to select the optimum quantity of sealing material for forming the elastomeric sealing element.

SUMMARY OF THE INVENTION

The object of the present invention is to provide a flat gasket of the type initially mentioned which enables a reliable seal between the component sealing face concerned and the flat gasket to be obtained irrespective of tolerance-induced fluctuations in the height of a step in at least one of the component sealing faces.

In the case of a flat gasket having the features of the preamble of Claim 1, this object is solved according to the invention in that the flat gasket comprises at least one overflow space which receives excess, as yet uncured sealing material of the sealing element during assembly of the flat gasket and is disposed at least partly laterally next to the sealing element—viewed in a plan view onto the flat gasket—when the flat gasket is in the unfitted, unpressed state.

In the case of the flat gasket according to the invention the quantity of sealing material which is applied to the first gasket layer can be metered such that a sufficient sealing effect is obtained through the elastomeric sealing element even in the case of a maximum height of a step in one of the component sealing faces occurring on account of the manufacturing and mounting tolerances.

The excess sealing material remaining in the case of a smaller stop height is displaced when the flat gasket is mounted in a direction substantially parallel to the main faces of the flat seal into the overflow space disposed laterally next to the originally applied gasket bead, in which space this excess sealing material can be cured without impairing the sealing effect of the flat gasket.

Due to the presence of the overflow space and the excess supply, which this allows, of the sealing material for the elastomeric sealing element, a reliable seal is therefore obtained at the component sealing face concerned irrespective of the height actually existing in the individual case of the step in one of the component sealing faces, as on the one hand sufficient sealing material is available for forming a sufficiently thick sealing bead and on the other the excess sealing material can escape into the overflow space and be cured here without entering between the gasket layers of the flat gasket outside of the region of the overflow space and undesirably holding these at a spacing from one another.

In one preferred configuration of the flat gasket according to the invention the overflow space comprises at least one recess which is provided at one of the gasket layers of the flat gasket and which is disposed at least partly laterally next to the sealing element—viewed in a plan view onto the flat gasket—when the flat gasket is in the unfitted, unpressed state.

This recess is preferably directly adjacent to the as yet uncured gasket bead which is applied to the first gasket layer when the flat gasket is in the unfitted, unpressed state.

The recess at one of the gasket layers of the flat gasket creates inside the flat gasket a sufficient alternative volumetric capacity for receiving a considerable volume of excess, as yet uncured sealing material during assembly of the flat gasket.

In order to prevent the sealing material from running into the recess before the flat gasket is mounted, the recess preferably does not overlap with the sealing element—viewed in a plan view onto the flat gasket—when the flat gasket is in the unfitted, unpressed state.

In one preferred configuration of the invention the recess is disposed at the first gasket layer to which the sealing material, which can be cured in situ, is also applied. This means that the excess sealing material only has to cover a short distance until it enters the recess of the overflow space.

The recess forming the overflow space may be surrounded by the gasket layer in which it is formed.

As an alternative to this, the recess may also open out at an outer edge of the gasket layer at which it is provided.

In a particular configuration of the flat gasket according to the invention the recess overlaps at least partly with the cut-out in the second gasket layer—viewed in a plan view onto the flat gasket.

The elastomeric sealing element extends through this cut-out, preferably up to one of the component sealing faces which is pressed against the flat gasket, when the flat gasket is in the fitted state.

The recess may be formed so as to be shorter in the longitudinal direction of the sealing element than the cut-out in the second gasket layer.

It is also possible for the recess to be shorter in the longitudinal direction of the sealing element than the sealing element when the flat gasket is in the unfitted, unpressed state.

In order to prevent excess sealing material from reaching one of the component sealing faces from the overflow space, it is favourable for the second gasket layer to separate the overflow space at least partly, preferably completely, from one of the component sealing faces which are pressed against the flat gasket when the flat gasket is in the fitted state.

For the same reason it is of advantage for the flat gasket to comprise at least one further gasket layer which separates the overflow space at least partly, preferably completely, from one of the component sealing faces which are pressed against the flat gasket when the flat gasket is in the fitted state.

It is particularly favourable for the overflow space to be separated at least partly, preferably completely, by at least one gasket layer in each case from the component sealing faces lying opposite one another and pressed against the flat gasket when the flat gasket is in the fitted state. This prevents excess sealing material from reaching one of the two component sealing faces lying opposite one another from the overflow space.

In one preferred configuration of the flat gasket according to the invention the engine components comprise a cylinder head, an engine block, a chain case lower part adjacent to the engine block and/or a chain case upper part adjacent to the cylinder head, wherein one of the component sealing faces is formed by the engine block as well as optionally by the chain case lower part, another of the component sealing faces is formed by the cylinder head as well as optionally by the chain case upper part, and the flat gasket is formed as a cylinder head gasket with a chain case sealing region. In this case the sealing element is in addition formed and disposed to bridge a joint between the chain case lower part and the engine block or to bridge a joint between the chain case upper part and the cylinder head.

In the case of a cylinder head gasket according to the invention of this kind with a chain case sealing region the overflow space is preferably disposed at least partly between the sealing element and an edge of the flat gasket which is on the chain case opening side—viewed in a plan view onto the flat gasket—when the flat gasket is in the unfitted, unpressed state.

The overflow space may in particular open out at an edge of the flat gasket which is on the chain case opening side. In this case, given extreme oversupply of the sealing material, excess sealing material could emerge from the overflow space into the interior space of the chain case if the receiving capacity of the overflow space is exhausted.

It is also possible, in the case of the flat gasket according to the invention, for the sealing element to be formed as an elongated bead of an elastomeric material which is applied to the first gasket layer and for the cut-out of the second gasket layer to be formed as an elongated window lying above or below this bead.

Further features and advantages constitute the subject matter of the following description and the graphic representation of an embodiment.

BRIEF DESCRIPTION OF THE DRAWINGS

Identical or functionally equivalent elements are marked by the same reference characters in all the figures.

DETAILED DESCRIPTION OF THE INVENTION

Figure 1:
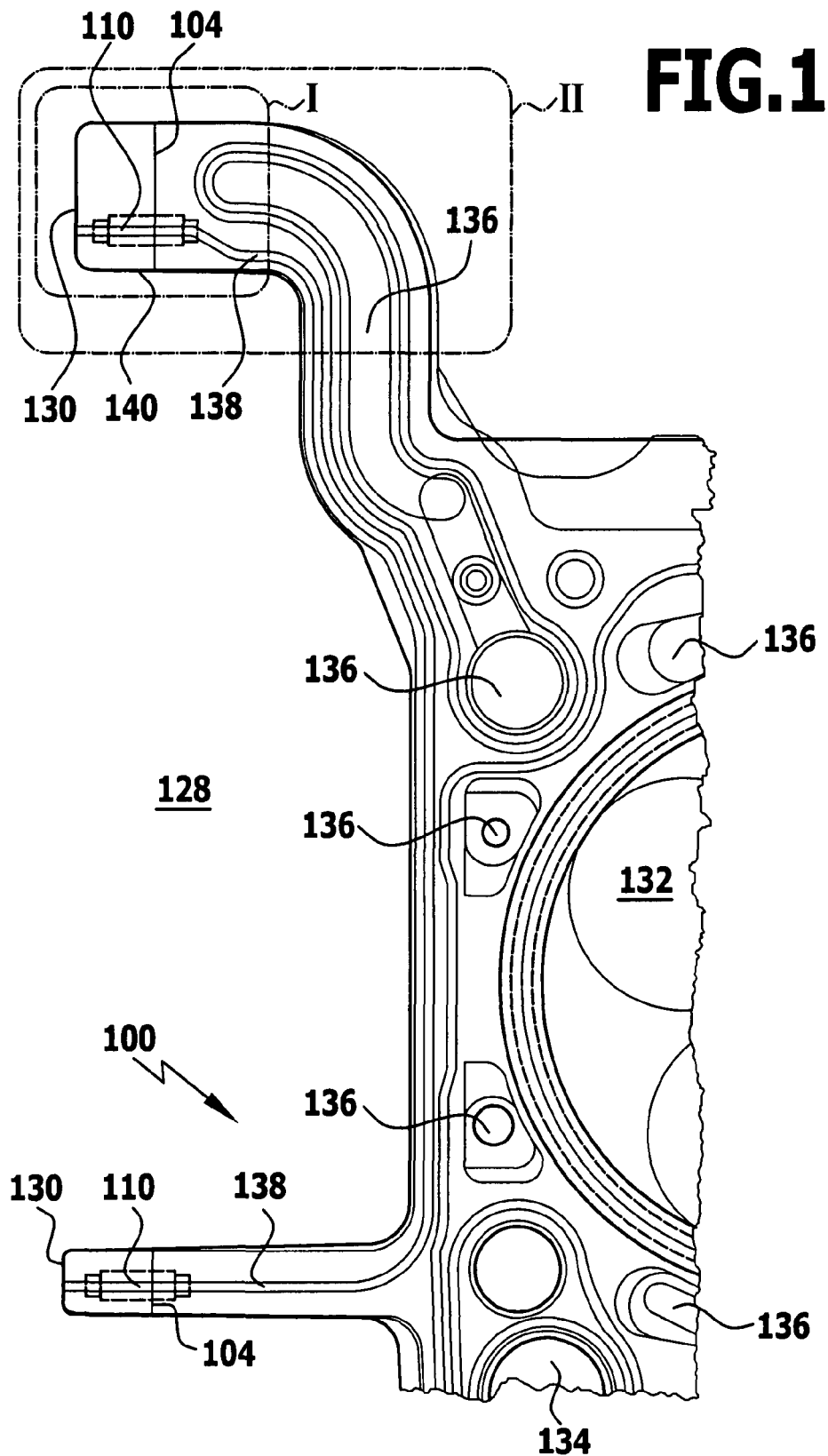
FIG. 1 is a plan view onto a portion of a cylinder head gasket with a chain case sealing region.

A cylinder head gasket, which is represented in FIGS. 1 to 7 and marked as a whole by 100, with a chain case sealing region comprises (see in particular FIGS. 3 and 4), for example, four gasket layers, namely a first gasket layer 102, at which an elastomeric sealing element 110, which crosses the joint 104, is in each case disposed in the region of joints 104 between an engine block 106 and a chain case lower part 108;

a second gasket layer 114 disposed between the first gasket layer 102 and a first component sealing face 112, which is formed by the top side of the engine block 106 and the top side of the chain case lower part 108, when the cylinder head gasket 100 is in the fitted state;

a third gasket layer 122 lying against a second component sealing face 118, which is formed by the underside of a cylinder head 116, when the cylinder head gasket 100 is in the fitted state, as well as a fourth gasket layer 120 disposed between the first gasket layer 102 and the third gasket layer 122.

In this embodiment the chain case upper part, which forms an upper boundary of the chain case, is formed integrally with the cylinder head 116, so that there is no joint between the chain case upper part and the cylinder head.

Generally speaking, however, the chain case upper part could be formed separately from the cylinder head 116 and flange-mounted laterally on the cylinder head 116, as is the case with regard to the chain case lower part 108 in relation to the engine block 106.

Figure 4:
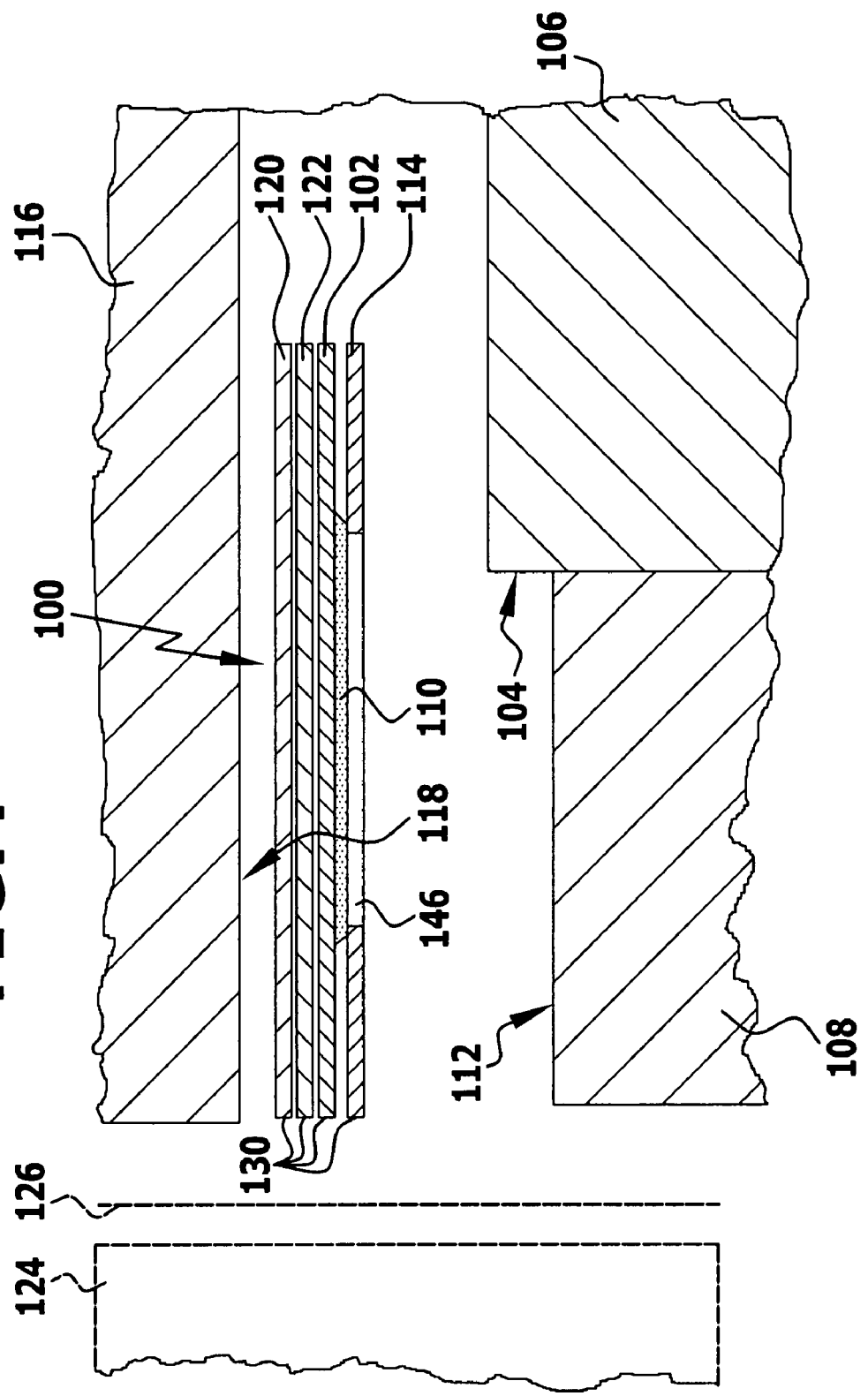
FIG. 4 is a schematic section through the cylinder head gasket with a chain case sealing region and the components (engine block, chain case lower part and cylinder head) which are to be sealed in the region of an elastomeric sealing element of the cylinder head gasket.

In the embodiment which is represented here the chain case lower part 108 is formed so as to be open on its side which is remote from the engine block 106, which is why the chain case is closed by means of an end cover 124 which is indicated by broken lines in FIG. 4 and which lies against the chain case lower part 108 and against the cylinder head 116 by way of an end cover gasket 126 likewise indicated by a broken line.

In this embodiment, on account of the presence of the end cover 124, the chain case sealing region of the cylinder head gasket 100 does not extend around the entire chain case opening 128; all the gasket layers 102, 114, 120 and 122 of the cylinder head gasket 100 rather end on both sides of the chain case opening 128 at a respective edge 130 which is on the end cover side and by way of which these gasket layers lie against the end cover gasket 126.

Generally speaking, the cylinder head gasket 100 may also comprise less or more than four gasket layers.

The second gasket layer 114, the third gasket layer 120 and the fourth gasket layer 122 consist of a springy metallic material, in particular of a spring steel plate.

The first gasket layer 102 likewise preferably consists of a metallic material, in particular a metal plate, and may be varied in terms of its thickness in order to adapt the overall thickness of the cylinder head gasket 100 in the fitted state to the desired height of the seal gap between the engine block 106 and the cylinder head 116.

All the gasket layers 102, 114, 120 and 122 are provided with a plurality of openings which pass through these gasket layers and are substantially aligned with one another, for example with a plurality of combustion chamber openings 132, screw holes 134 for the passage of cylinder head screws as well as fluid through-openings 136 for the passage of fluids, in particular water or oil, through the cylinder head gasket 100.

The springy gasket layers 114, 120 and 122 are provided with a plurality of beads which extend around the through-openings, in particular with a respective bead 138 which extends in the chain case sealing region of the cylinder head gasket 100 along the edge of the chain case opening 128, namely at a certain spacing from the edge 140 of the cylinder head gasket 100 which is on the chain case opening side.

The beads in the springy gasket layers 114, 120 and 122 preferably extend directly above one another, so that their bead crests preferably extend vertically above one another when the cylinder head gasket 100 is in the fitted state.

Figure 3:
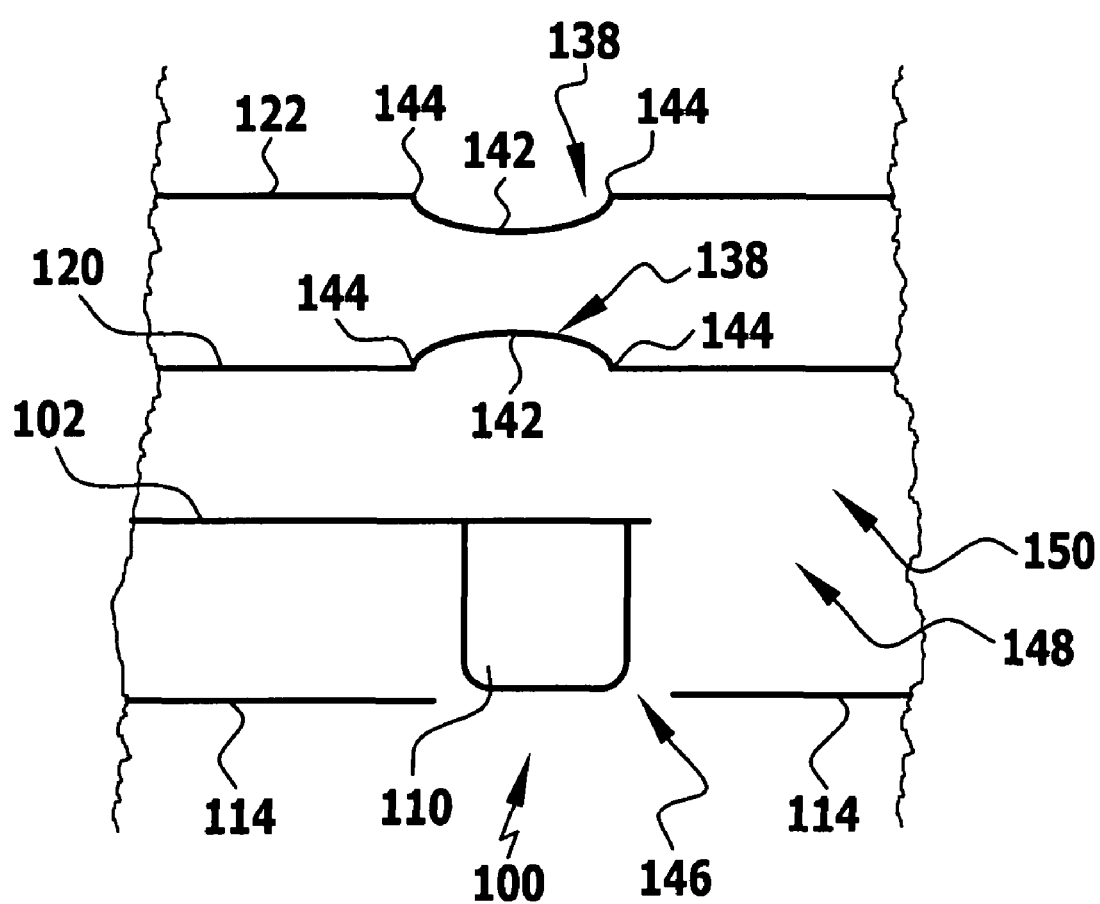
FIG. 3 is a schematic section through the cylinder head gasket along the line 3-3 in FIG. 2.

As can be seen from FIG. 3, in this embodiment the beads 138 are formed as full beads in the case of which a bead crest 142 extends substantially centrally between two bead feet 144.

In the ideal case the engine block 106 and the chain case lower part 112 would form a continuous, plane component sealing face 112 against which the cylinder head gasket 100 is pressed in the fitted state.

However, due to manufacturing and mounting tolerances, the first component sealing face 112 forms a small step in the region of the joint 104 between the engine block 106 and the chain case lower part 112.

The first component sealing face 112 can thus lie at a level in the region of the chain case lower part 108 which is lower by 0.2 mm±0.2 mm, i.e. by up to 0.4 mm, than in the region of the engine block 106.

Two substantially strand- or bead-shaped elastomeric sealing elements 110 are therefore disposed at the cylinder head gasket 100 on both sides of the chain case opening 120, namely next to the narrow sides of the chain case opening 128 such that they cross the joint 104 between the engine block 106 and the chain case lower part 108.

In order to produce these sealing elements 110, two beads, corresponding in length to the length of the sealing elements 110, of an initially pasty sealing material are applied to the surface of the first gasket layer 102 which is on the engine block side, which material can in particular set by heating so that it initially has plastic properties in addition to elastic properties and then just elastic properties.

A polyurethane material may be used as a sealing material of this kind, for example.

As can be seen from FIGS. 2, 3 and 5, the second gasket layer 114 comprises a window-like cut-out 146 below each sealing element 110, the form of which cut-out corresponds to an elongated hole or a long, narrow rectangle which extends in the longitudinal direction of the respective adjacent sealing element 110, the sealing elements 110 having a greater longitudinal extent than the cut-outs 146 and extending beyond the edges of the cut-outs 146 in the direction of the beads 138.

The bead 138 at the second gasket layer 114 is interrupted in its longitudinal direction by the cut-out 146.

The sealing elements 110 are higher by a multiple than the thickness of the second gasket layer 114 (i.e. their extent is higher by a multiple perpendicularly to the main faces of the cylinder head gasket 100; see FIG. 3).

In a preferred embodiment the height of the sealing elements 110 is in each case approximately 0.7 mm to 0.9 mm, while the plate thickness of the second gasket layer 114 is approximately 0.20 mm to 0.25 mm.

Figure 2:
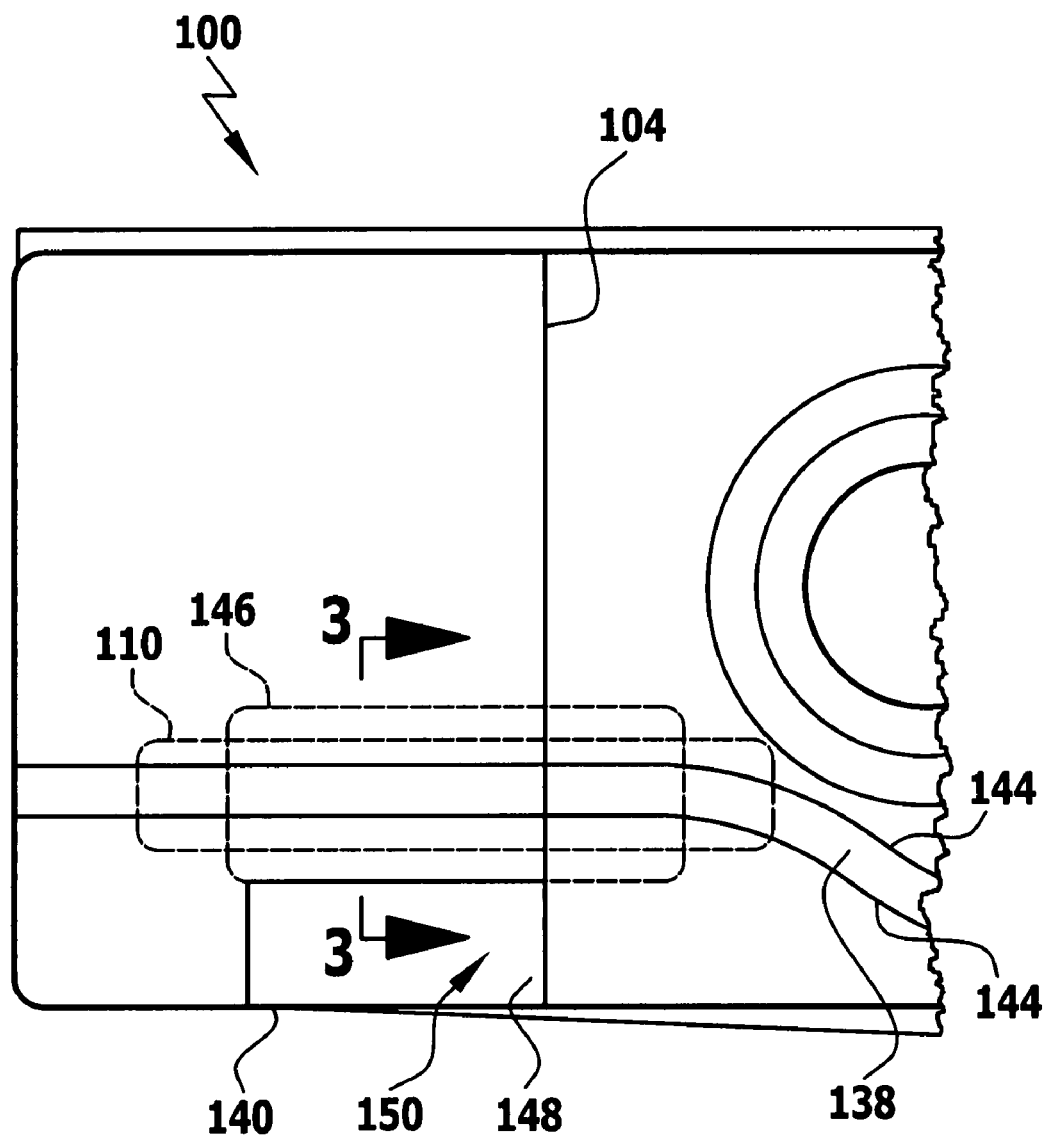
FIG. 2 is an enlarged representation of the region I from FIG. 1.
Figure 5:
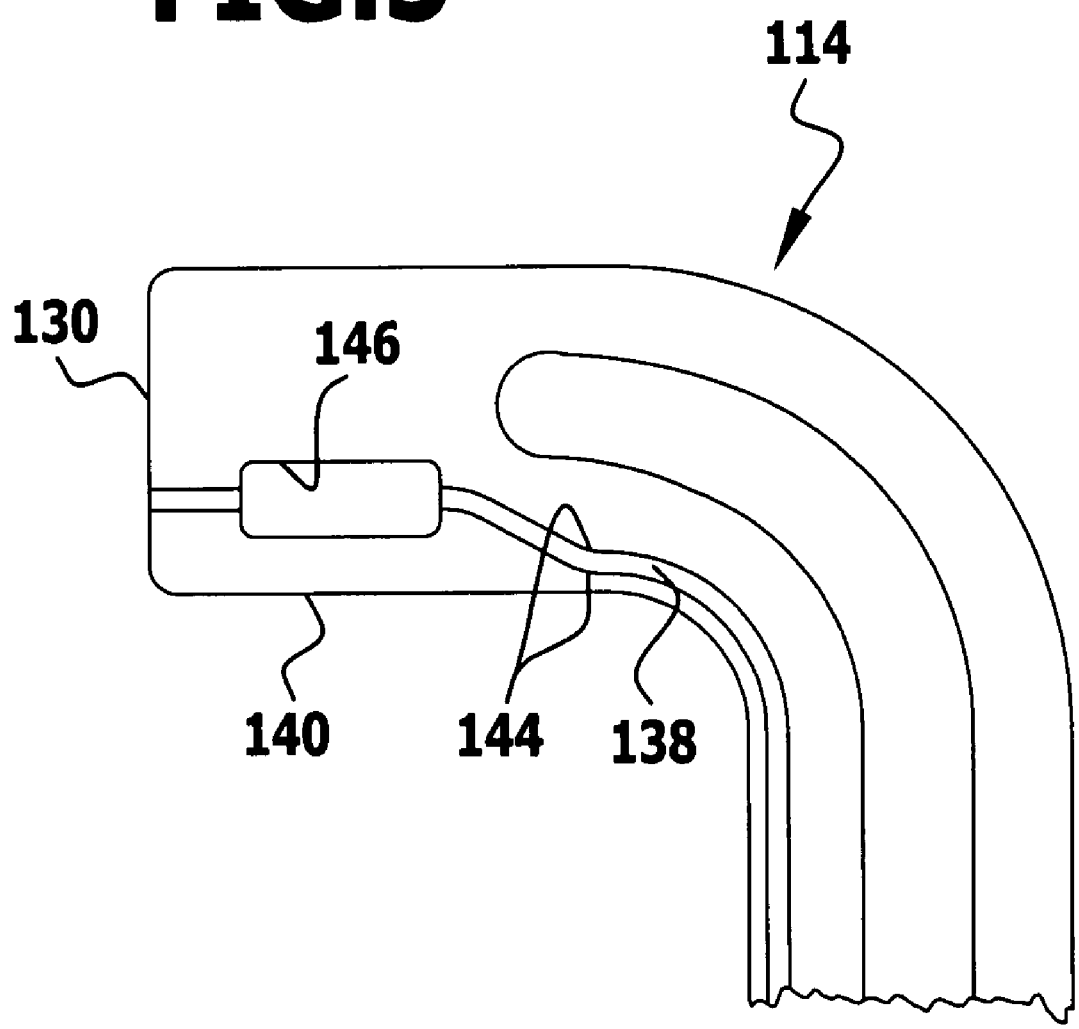
FIG. 5 is a schematic plan view from above onto a portion of a gasket layer of the cylinder head gasket which is on the block side and lies against the engine block and against the chain case lower part when the cylinder head gasket is in the fitted state, in the region II in FIG. 1.
Figure 6:
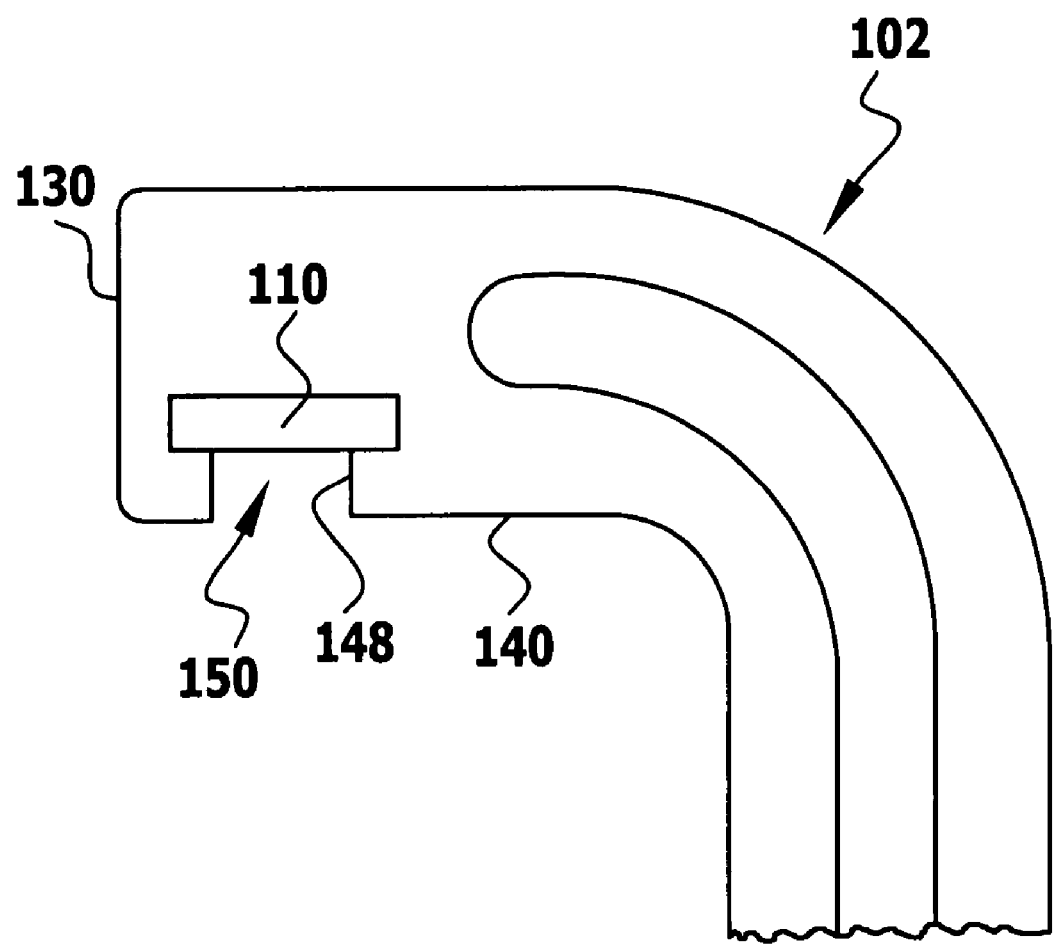
FIG. 6 is a plan view corresponding to FIG. 5 onto a portion of a gasket layer of the cylinder head gasket which bears the elastomeric sealing element.
Figure 7:
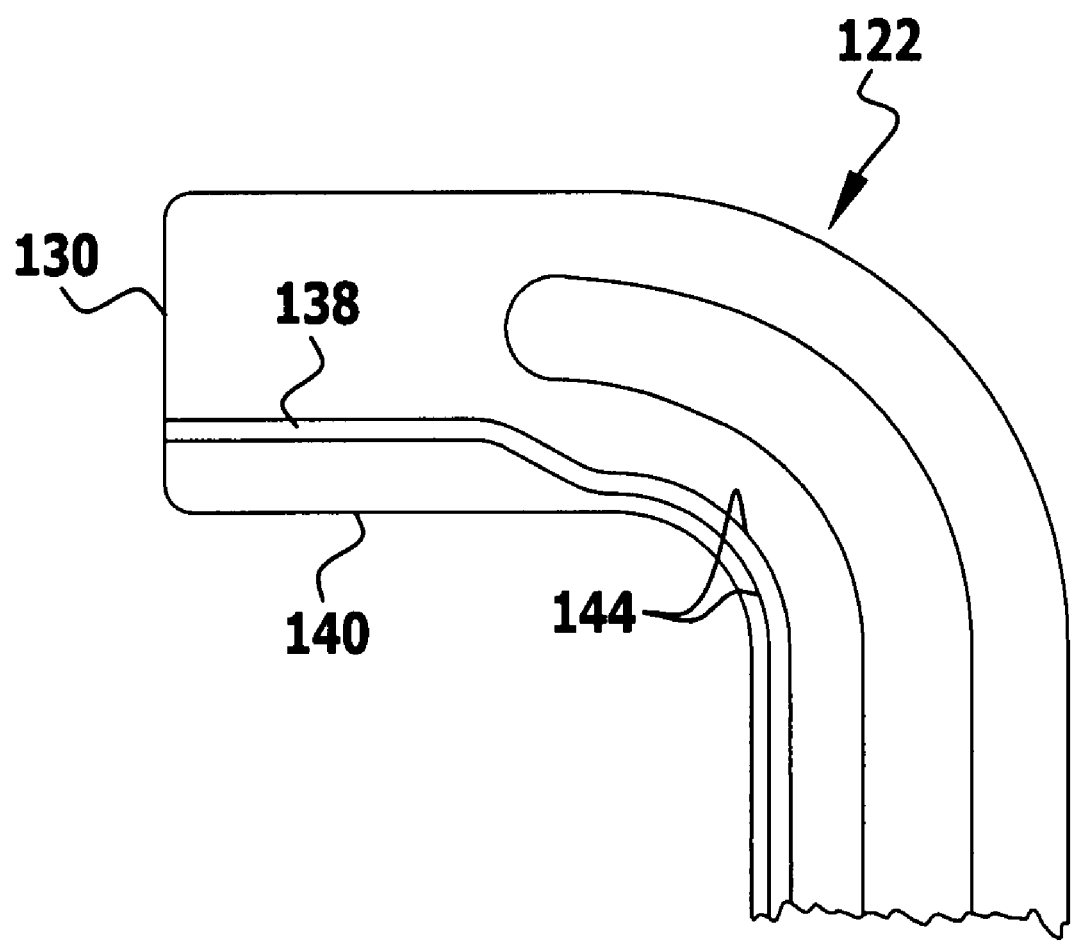
FIG. 7 is a plan view corresponding to FIGS. 5 and 6 onto a portion of a gasket layer of the cylinder head gasket which is on the cylinder head side and lies against the cylinder head when the cylinder head gasket is in the fitted state.

When applying the sealing material subsequently forming the sealing elements 116 to the first gasket layer 102, the sealing material initially forms the gasket bead 110 (so-called CIP (Cure In Place) bead) which is represented in FIGS. 2, 3 and 5 when the cylinder head gasket 100 is in the unfitted, unpressed state. Upon fitting the cylinder head gasket 100 and clamping the gasket between the component sealing faces 112 and 118, the sealing material enters the cut-out 146 and passes through this cut-out, so that it projects beyond the main surface of the cylinder head gasket 100 which is on the block side and is pressed against the first component sealing face 112, this being precisely in the region of the joint 104. The sealing material then forms an elongated, elastomeric rib, which is pressed against the first component sealing face 112, on the outside of the cylinder head gasket 100 below the cut-out 146.

The quantity of sealing material which is applied to the first gasket layer 102 before the gasket layers 102, 114, 120 and 122 are assembled to form the cylinder head gasket 100 is adjusted such that a sufficient sealing effect is obtained through the elastomeric sealing element 110 at the joints 104 even in the case of a maximum height of the step in the first component sealing face 112 at the joints 104 between the engine block 106 and chain case lower part 108 occurring on account of the manufacturing and mounting tolerances.

If the height of the step actually occurring at the joints 104 is less than this maximum height, this means that too much sealing material is available.

When the cylinder head gasket 100 is mounted and pressed between the component sealing faces 112 and 118, this excess sealing material is displaced in a direction substantially parallel to the main faces of the cylinder head gasket 100 by the first gasket layer 102 into a recess 148 which is disposed laterally next to the respective elastomeric sealing element 110 and is formed at the first gasket layer 102 in the region between the respective sealing element 110 on one side and the edge 140 of the first gasket layer 102 which is on the chain case opening side.

This recess 148 therefore forms an overflow space 150 which, when the cylinder head gasket 100 is mounted, receives excess, as yet uncured sealing material of the sealing element 110 and is disposed laterally next to the sealing element 110—viewed in a plan view onto the cylinder head gasket 100—when the cylinder head gasket 100 is in the unfitted, unpressed state.

This overflow space 150 is separated from the first component sealing face 112 by the underlying second gasket layer 114 and from the second component sealing face 118 by the overlying third gasket layer 122 as well as the overlying fourth gasket layer 120, so that the excess sealing material cannot reach these component sealing faces 112, 118.

It is also impossible for the excess sealing material to enter between the first gasket layer 102 and the second gasket layer 114 on the side of the sealing element 110 which lies opposite the recess 148, as these gasket layers 102, 114 are pressed against one another between the component sealing faces 112 and 118 when the cylinder head gasket 100 is fitted and pressed.

Due to the presence of the overflow space 150 and the excess supply, which this allows, of the sealing material for the sealing elements 110, a reliable seal is therefore obtained irrespective of the height actually existing in the individual case of the step in the first component sealing face 112 at the joints 104 between the engine block 106 and the chain case lower part 108, as on the one hand sufficient sealing material is available for forming a sufficiently thick sealing bead and on the other the excess sealing material can escape into the overflow space 150 and be cured here without entering between the gasket layers 102, 114 and 120 outside of the region of the recess 148 and undesirably holding these at a spacing from one another.

Figure 8:
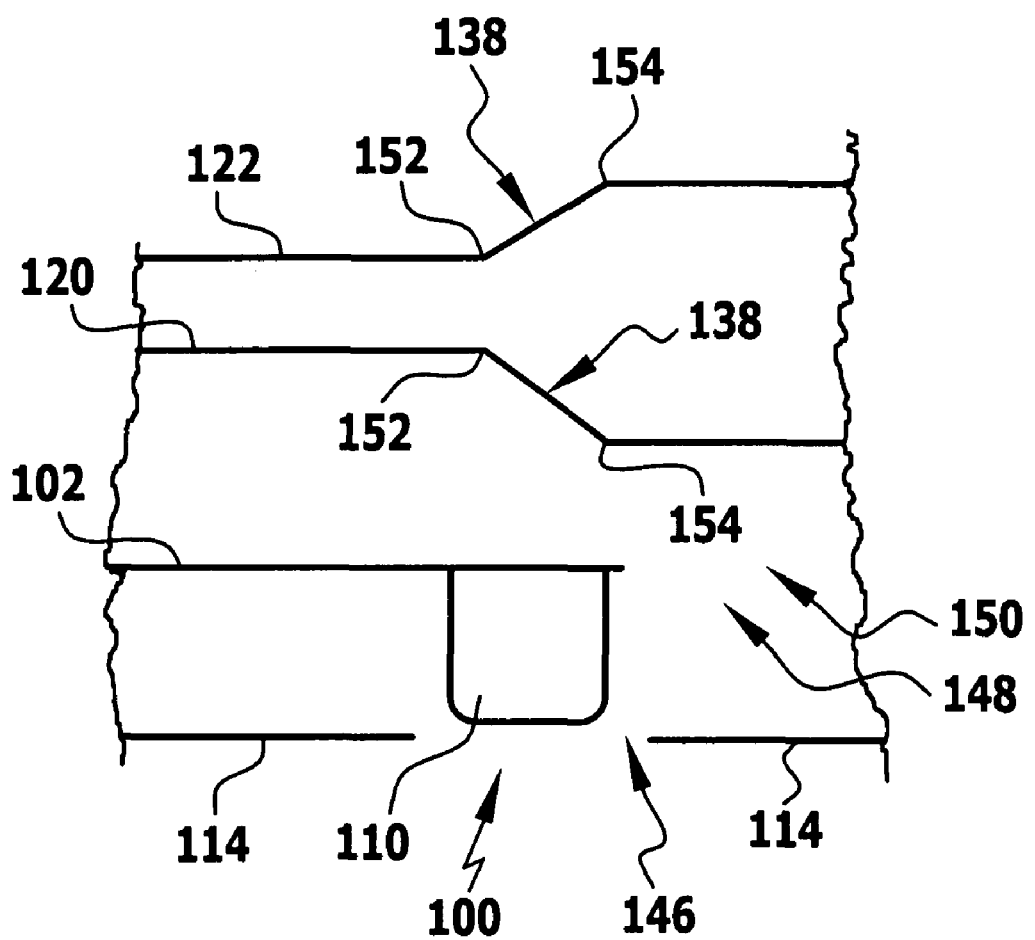
FIG. 8 is a schematic cross section corresponding to FIG. 3 through a second embodiment of a cylinder head gasket with a chain case sealing region, in which the beads provided at the gasket layers which are on the cylinder head side and at the gasket layer which is on the block side are formed as half beads instead of as full beads.

A second embodiment, which is represented in FIG. 8, of a cylinder head gasket 100 with a chain case sealing region only differs from the embodiment which is represented in FIGS. 1 to 7 in that the beads 138 in the springy gasket layers 114, 120 and 122 are not—as in the case of the first embodiment—formed as full beads, but instead as half beads with bead feet 152 and bead crests 154.

Otherwise the second embodiment of the cylinder head gasket 100 which is represented in FIG. 8 corresponds in terms of function and structure to the first embodiment which is represented in FIGS. 1 to 7 and the preceding description of which is referred to in this respect.

The invention claimed is:

1. A flat gasket for sealing a seal gap between component sealing faces, which can be pressed against the flat gasket, of engine components that comprise a cylinder head, an engine block, a chain case lower part adjacent to the engine block and/or a chain case upper part adjacent to the cylinder head wherein one of the component sealing faces is formed by the engine block as well as optionally by the chain case lower part, another of the component sealing faces is formed by the cylinder head as well as optionally by the chain case upper part, and a joint is formed between the chain case lower part and the engine block or between the chain case upper part and the cylinder head, and wherein the flat gasket is formed as a cylinder head gasket with a chain case sealing region, wherein the flat gasket comprises at least one first gasket layer as well as a second gasket layer which is adjacent to the first gasket layer, wherein at least one joint-crossing elastomeric sealing element is disposed at the first gasket layer, which element is formed from a sealing material which is applied to the first gasket layer and can be cured in situ, wherein at least one joint-crossing cut-out is provided at the second gasket layer and so disposed relative to the elastomeric sealing element that the elastomeric sealing element extends through the cut-out when the flat gasket is in the fitted state, wherein the flat gasket comprises at least one overflow space disposed to receive excess, as yet uncured sealing material of the sealing element during assembly of the flat gasket and is disposed at least partly laterally next to the sealing element—viewed in a plan view onto the flat gasket—when the flat gasket is in the unfitted, unpressed state, wherein the at least one cut-out is arranged below or above the at least one elastomeric sealing element when the flat gasket is in the unfitted, unpressed condition, wherein the second gasket layer is provided with a bead, wherein the elastomeric sealing element extends beyond at least one edge of the cut-out in a longitudinal direction of the bead, and wherein the bead at the second gasket layer is interrupted in its longitudinal direction by the cut-out.

2. The flat gasket according to claim 1, wherein the overflow space comprises at least one recess, which is disposed at least partly laterally next to the sealing element—viewed in a plan view onto the flat gasket—when the flat gasket is in the unfitted, unpressed state.

3. The flat gasket according to claim 2, wherein the recess does not overlap with the sealing element—viewed in a plan view onto the flat gasket—when the flat gasket is in the unfitted, unpressed state.

4. The flat gasket according to claim 2, wherein the recess is disposed at the first gasket layer.

5. The flat gasket according to claim 2, wherein the recess opens out at an outer edge of the gasket layer at which it is provided.

6. The flat gasket according to claim 2, wherein the recess overlaps at least partly with the cut-out in the second gasket layer—viewed in a plan view onto the flat gasket.

7. The flat gasket according to claim 2, wherein the recess is shorter in the longitudinal direction of the sealing element than the cut-out in the second gasket layer.

8. The flat gasket according to claim 2, wherein the recess is shorter in the longitudinal direction of the sealing element than the sealing element when the flat gasket is in the unfitted, unpressed state.

9. The flat gasket according to claim 1, wherein the second gasket layer separates the overflow space at least partly from one of the component sealing faces which are pressed against the flat gasket when the flat gasket is in the fitted state.

10. The flat gasket according to claim 1, wherein the flat gasket comprises at least one further gasket layer, which separates the overflow space at least partly from one of the component sealing faces which are pressed against the flat gasket when the flat gasket is in the fitted state.

11. The flat gasket according to claim 1, wherein the overflow space is separated at least partly by at least one gasket layer in each case from the component sealing faces lying opposite one another and pressed against the flat gasket when the flat gasket is in the fitted state wherein said at least one gasket layer comprises at least one of the first gasket layer, the second gasket layer and an additional gasket layer.

12. The flat gasket according to claim 1, wherein the overflow space is disposed at least partly between the sealing element and an edge of the flat gasket which is on the chain case opening side—viewed in a plan view onto the flat gasket—when the flat gasket is in the unfitted, unpressed state.

13. The flat gasket according to claim 1, wherein the overflow space opens out at an edge of the flat gasket which is on the chain case opening side.

14. The flat gasket according to claim 1, wherein the sealing element is formed as an elongated bead of an elastomeric material which is applied to the first gasket layer, and the cut-out of the second gasket layer is formed as an elongated window lying above or below this bead.

* * * * *